(12) United States Patent
Ramaley et al.

(10) Patent No.: US 11,812,075 B2
(45) Date of Patent: *Nov. 7, 2023

(54) ENHANCED SERVICE COMPATIBILITY WITH CLIENTS

(71) Applicant: Comcast Cable Communications Management, LLC, Philadelphia, PA (US)

(72) Inventors: Alan Ramaley, Seattle, WA (US); Brian Burkhart, Seattle, WA (US); George Lester, Philadelphia, PA (US)

(73) Assignee: Comcast Cable Communications Management, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/208,846

(22) Filed: Mar. 22, 2021

(65) Prior Publication Data

US 2022/0021912 A1 Jan. 20, 2022

Related U.S. Application Data

(63) Continuation of application No. 15/679,986, filed on Aug. 17, 2017, now Pat. No. 10,999,609.

(51) Int. Cl.
*H04N 21/2347* (2011.01)
*H04N 21/442* (2011.01)
(Continued)

(52) U.S. Cl.
CPC ....... *H04N 21/2347* (2013.01); *H04L 65/612* (2022.05); *H04L 65/70* (2022.05); *H04L 67/02* (2013.01); *H04N 21/26258* (2013.01); *H04N 21/44204* (2013.01); *H04N 21/44226* (2020.08); *H04N 21/472* (2013.01);
(Continued)

(58) Field of Classification Search
CPC ......... H04N 21/2347; H04N 21/26258; H04N 21/236; H04N 21/44204; H04N 21/44222; H04N 21/472; H04N 21/6543; H04N 21/812; H04N 21/845; H04N 21/8586; H04L 65/4084; H04L 65/607; H04L 67/02
See application file for complete search history.

(56) References Cited

U.S. PATENT DOCUMENTS 8,910,263 B1 * 12/2014 Martini ................ H04W 12/08 726/8
9,794,604 B2 10/2017 Ohno et al.
(Continued)

*Primary Examiner* — Nnenna N Ekpo
(74) *Attorney, Agent, or Firm* — Ballard Spahr LLP

(57) ABSTRACT

Methods and systems for enhancing service compatibility are described. A request for content can be received from a client (e.g., user device). A first resource locator for at least a portion of the content can be encoded with service information. A second resource locator indicating a redirect device can comprise the encoded first resource locator and the service information. The client can request at least the portion of the content from a redirect device using the second resource locator. The redirect device can process the request by decoding the first resource locator and service information and sending the service information to a service. The redirect device can send the first resource locator to the client. The client can request at least the portion of the content from a content device using the first resource locator.

20 Claims, 7 Drawing Sheets

(51) Int. Cl.
*H04N 21/845* (2011.01)
*H04N 21/81* (2011.01)
*H04N 21/858* (2011.01)
*H04N 21/472* (2011.01)
*H04L 67/02* (2022.01)
*H04N 21/6543* (2011.01)
*H04N 21/262* (2011.01)
*H04L 65/70* (2022.01)
*H04L 65/612* (2022.01)
*H04L 67/146* (2022.01)
*H04L 67/01* (2022.01)

(52) U.S. Cl.
CPC ....... *H04N 21/6543* (2013.01); *H04N 21/812* (2013.01); *H04N 21/845* (2013.01); *H04N 21/8586* (2013.01); *H04L 67/01* (2022.05); *H04L 67/146* (2013.01)

(56) References Cited

U.S. PATENT DOCUMENTS

| | | |
|---|---|---|
| 10,133,979 B1 | 11/2018 | Eidam et al. |
| 10,430,487 B2 | 10/2019 | Cattone et al. |
| 10,506,262 B2 * | 12/2019 | Ma ............... H04N 21/2662 |
| 2008/0263579 A1 | 10/2008 | Mears et al. |
| 2009/0138907 A1 | 5/2009 | Wiser et al. |
| 2011/0153426 A1 | 6/2011 | Reddy et al. |
| 2011/0246621 A1 | 10/2011 | May, Jr. et al. |
| 2012/0221724 A1 | 8/2012 | Chor |
| 2014/0250471 A1 | 9/2014 | Guerra |
| 2016/0104203 A1 * | 4/2016 | Roosenraad ........ H04L 65/4084 705/14.66 |
| 2016/0127440 A1 | 5/2016 | Gordon |
| 2017/0153426 A1 * | 6/2017 | Kubota ............... G02B 9/62 |
| 2017/0272485 A1 | 9/2017 | Gordon et al. |
| 2018/0131986 A1 | 5/2018 | Cole et al. |
| 2019/0037015 A1 * | 1/2019 | Hunt ............... H04L 67/1085 |

\* cited by examiner

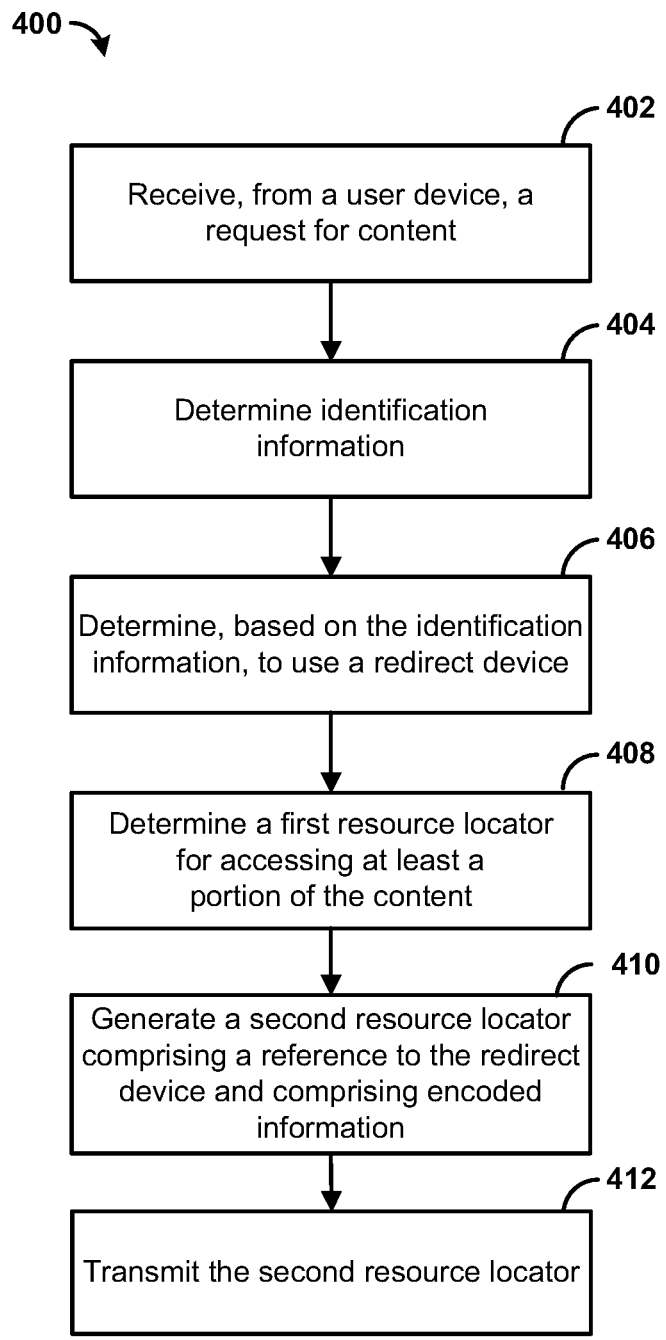

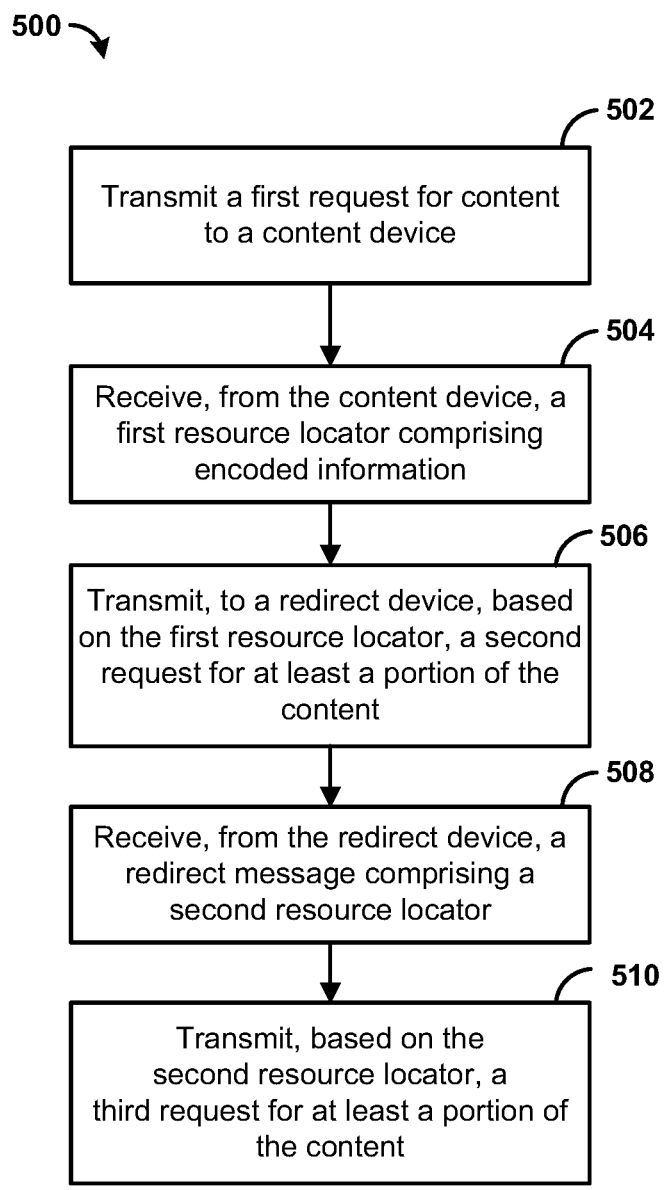

ENHANCED SERVICE COMPATIBILITY WITH CLIENTS

CROSS REFERENCE TO RELATED PATENT APPLICATION

This application claims priority under 35 U.S.C. § 120 to, and is a continuation of, U.S. patent application Ser. No. 15/679,986, filed Aug. 17, 2017, the entire contents of which are hereby incorporated herein by reference in its entirety for all purposes.

BACKGROUND

Users access content via a variety of devices and applications with different capabilities. Devices and/or applications with minimal capabilities do not support some services offered by content providers. Lack of support for these services may create a less customized experience for users. These and other shortcomings are addressed by the methods and systems described herein.

SUMMARY

It is to be understood that both the following general description and the following detailed description are examples and explanatory only and are not restrictive. Methods and systems are disclosed for providing enhanced services for devices (e.g., clients, user devices, mobile devices, etc.) with minimal capabilities. An example client can request content. The request can comprise a request for an index file that lists content segments and corresponding locations for requesting the segments. A content device can receive the request and determine that the client lacks functionality to support a service, such as an advertisement impression tracking service, a content consumption tracking service, and/or the like. The content device can generate a custom index file to allow the client to support the service via the help of a redirect device. For example, the content device can insert encoded information into resource locators in the index file. The resource locators can identify the redirect device and the encoded information can be used to track usage of a service. If the redirect device receives a request for a content segment from the client, the redirect device can decode the encoded information and use the decoded information to communicate with the service on behalf of the client. The encoded information can also comprise the location of the content segment (e.g., which may be accessed at another device). The redirect server can forward the location of the content segment (e.g., as a uniform resource locator, or URL) back to the client with a message redirecting the client to the location.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, provides examples and together with the description, serve to explain the principles of the methods and systems:

FIG. 4 is a flowchart of an example method for supporting content services;

FIG. 5 is a flowchart of another example method for supporting content services;

DETAILED DESCRIPTION

Figure 1:
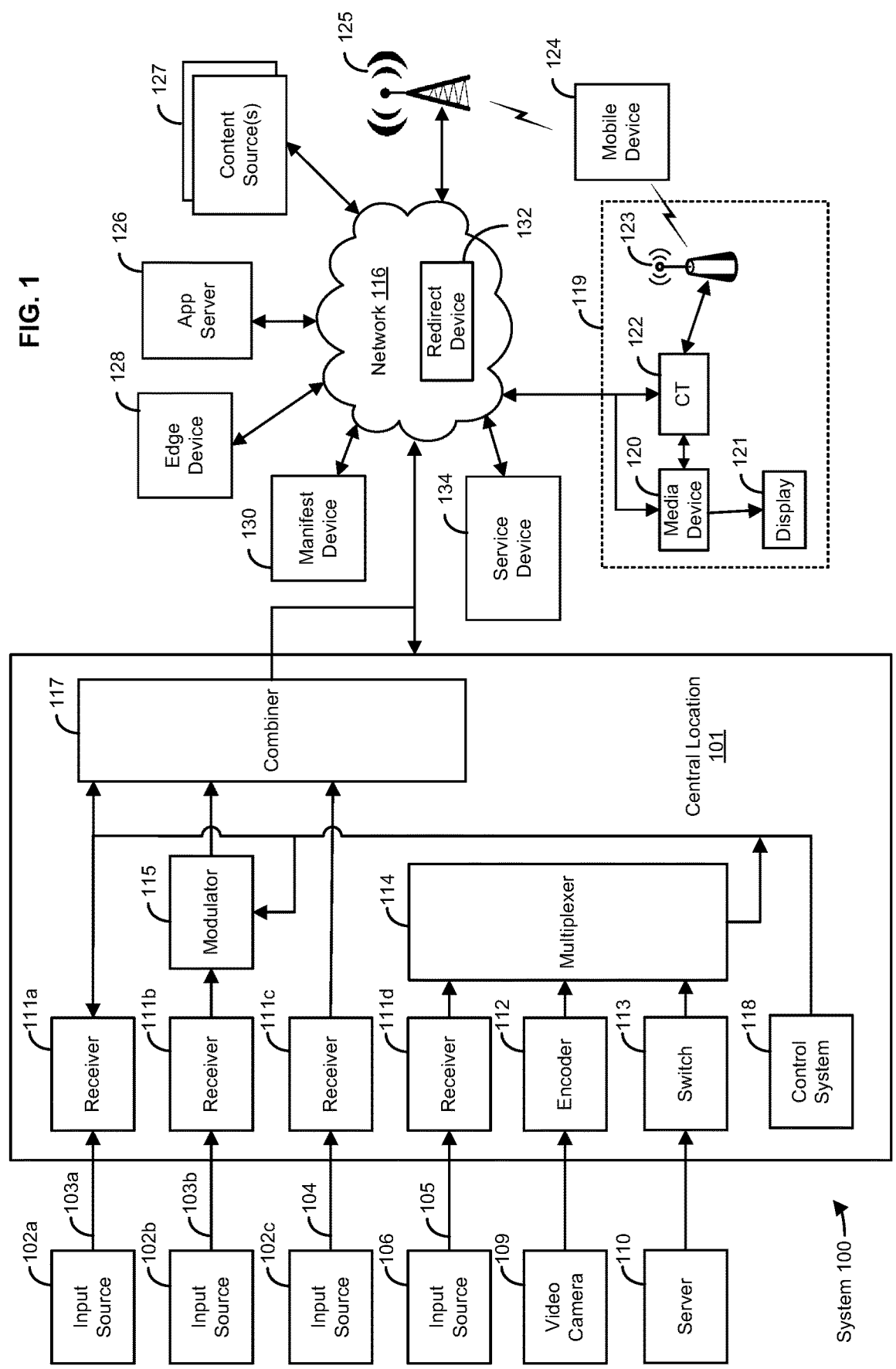
FIG. 1 is an example system in which the present methods and systems can operate.

Before the present methods and systems are disclosed and described, it is to be understood that the methods and systems are not limited to specific methods, specific components, or to particular implementations. It is also to be understood that the terminology used herein is for describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowcharts of methods, systems, apparatuses and computer program products. It will be understood that each block of the block diagrams and flowcharts, and combinations of blocks in the block diagrams and flowcharts, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4k, Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP), Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

The present disclosure relates to enhancing compatibility with services related to content delivery. "Smart" video players and clients (e.g., user devices, mobile devices, set-top boxes, etc.) are sophisticated enough to make subsequent or parallel request to other servers, such as tracking servers, that allow a service provider to know that a video has been watched. Limited clients, such as browsers or other limited-functionality video players, are not able to make such request. Instead, limited clients simply make requests to the video streamer asking for the next sequence of video packets that the limited client should play. This results in a loss of tracking and metric capability for these limited clients.

The present methods and systems allow a limited client to request content but, external to that limited client, messages (e.g., or requests) can be sent on the limited client's behalf to a service associated with the content, such as a tracking server, advertisement impression server, and/or other related system.

A client (e.g., limited client, client device, client application, user device, mobile device, set-top box, etc.) can transmit a request (e.g., HTTP GET or similar) for content (e.g., video, audio). A server (or other computing device) receiving the request can determine information about the client (e.g., version, browser, capabilities). For example, the request can identify the client as a particular type of client (e.g., web browser). As another example, the client can be queried by the server to determine a type of client in response to receiving the request. The server receiving the request can inspect the request and determine the information about the client. For example, the information about the client can be located in a body of the request (e.g., HTTP body), in a query string of the request, combinations thereof, and/or the like.

The server can determine that the client is a limited client. The server can respond to the client with a first uniform resource locator (URL) that appears to the limited client as if the first URL indicates the location of the content. Instead of pointing directly to the content, however, the first URL can comprise a pointer to or identifier of a redirect service. The first URL can also comprise any service information (e.g., state information) that is necessary to service the request. For example, service information can be encoded with a second URL pointing to the actual content location. The second URL and service information can be encoded (or stored as plain text) as one or more attributes of the first URL pointing to the redirect service. The first URL can be one of many URLs in an index file transmitted to the client.

After receiving the first URL (e.g., in the index file), the client can transmit another request for the content to the first URL. The redirect service can receive the request to the first URL. The request sent by the client can have service information the redirect service can use to make a request on the client's behalf to a tracking service or other service. For example, the redirect service can decode the second URL and the service information that is encoded in the first URL.

The redirect service can issue a redirect (e.g., such as an HTTP 302) back to the client to redirect the client to the actual location of the content. The redirect message can comprise the second URL. The client can then send another request to the actual location of the content based on the second URL. The client can then play the content for a user.

The system can be stateless, allowing requests to be sent to any server in a cloud or cluster architecture without having to maintain state across multiple systems. The URLs provided by the system can represent the call for the video and any state information combined in to a single URL that the limited client is able to use.

FIG. 1 depicts an example system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., user location 119) via a network 116 (e.g., content distribution and/or access system).

The central location 101 can receive content from a variety of sources 102a, 102b, 102c. The content can be transmitted from the source to the central location 101 via a variety of transmission paths, including wireless (e.g., satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as an encoder 112, are included for encoding local content or a video camera 109 feed. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. The network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators 115 for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

A multitude of users can be connected to the network 116 at one or more of the user locations. At the user location 119, a media device 120 can demodulate and/or decode, if needed, the signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

The communication terminal 122 can be located at the user location 119. The communication terminal 122 can be configured to communicate with the network 116. The communication terminal 122 can comprise a modem (e.g., cable modem), a router, a gateway, a switch, a network terminal (e.g., optical network unit), and/or the like. The communication terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

The user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

The user location 119 may not be fixed. By way of example, a user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park).

The system 100 can comprise an application device 126. The application device 126 can be a computing device, such as a server. The application device 126 can provide services related to applications. For example, the application device 126 can comprise an application store. The application store can be configured to allow users to purchase, download, install, upgrade, and/or otherwise manage applications. For example, the application device 126 can be configured to allow users to download applications to a device, such as the mobile device 124, communication terminal 122, the media device 120, the display device 121, and/or the like. The application device 126 can run one or more application services to provide data, handle requests, and/or otherwise facilitate operation of applications for the user.

The system 100 can comprise one or more content source(s) 127 (e.g., in addition to sources 102a, 102b, 102c, and 106). The content source(s) 127 can be configured to provide content (e.g., video, audio, games, applications, data) to the user. The content source(s) 127 can be configured to provide streaming media, such as on-demand content (e.g., video on-demand), content recordings, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an internet protocol (IP) based connection. The content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

The system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device 128 and/or network conditions). The edge device 128 can be configured to package content for delivery to the user (e.g., in a specific format requested by a user device), provide streaming content (e.g., unicast, multicast), provide a file transfer, and/or the like. The edge device 128 can cache or otherwise store content (e.g., frequently requested content) to enable faster delivery of content to users. In some implementations, the edge device 128 can implement a manifest device 130, and/or a redirect device 132 described further herein.

The network 116 can comprise a manifest device 130. The manifest device 130 can be configured to deliver index files for content to clients (e.g., user device, media device 120, mobile device 124). For example, the media device 120 (e.g., or mobile device 124) can request an index file for a particular content item (e.g., show, movie, program, episode). Example index files are shown in FIG. 3A and FIG. 3B and described in further detail herein. The manifest device 130 can be configured to determine and/or generate a manifest file for a client based on the services supported by the client. For example, if the client supports (e.g., is configured to recognize and/or process) service information in the manifest file, then the service information can be inserted in the manifest (e.g., in metadata or other fields, where the service information would be recognized). If the client does not support service information, then the manifest device 130 can generate a modified index file with the service information encoded therein as described further herein. As explained further herein, generating a modified index file can comprise encoding identifiers (e.g., uniform resource identifiers) for content segments and/or encoding service information. For example, uniform resource identifiers for a plurality of content segments can be encoded and inserted as parameters for corresponding modified uniform resource identifier pointing to a redirect device 132. Service information can also be encoded for each content segment together with (e.g., or separately from) the encoded uniform resource identifiers. The manifest device 130 can send the modified index file to the requesting client. As a further explanation, the manifest device 130 can be configured to perform one or more of the steps of the method 400 of FIG. 4. The manifest device 130 can also perform any of the steps described for the manifest device 204 of FIG. 2. In some implementations, the generating of a modified index file can occur at a different device, such as one of the content sources 127.

The network 116 can comprise a redirect device 132. The redirect device 132 can be configured to assist a client, such as a user device (e.g., smartphone, laptop, etc.), the media device 120 or the mobile device 124, in supporting a service (e.g., a tracking service). The redirect device 132 can receive a request for a content segment (e.g., a 4 second, a 6 second, a 10 second, or any other appropriate length), and the redirect device 132 can decode encoded information in the request. The decoded information can comprise the service information. The redirect device 132 can process the service information (e.g., on behalf of the client). The redirect device 132 can process any service calls, transmit data, and/or perform any other function directed by the service information. For example, if the service information comprises a resource identifier (e.g., uniform resource identifier), the redirect device 132 can send a request (e.g., or other message or call) based on the resource identifier. As a further explanation, the redirect device 132 can be configured to perform one or more of the steps of the method 600 of FIG. 6. The redirect device 132 can also perform any of the steps described for the redirect device 206 of FIG. 2.

The network 116 can comprise a service device 134. The service device 134 can send and/or receive service information, such as data used for tracking user consumption (e.g., advertisement tracking data). For example, the service information can relate to tracking consumption of content by the client. The service information can comprise an identifier (e.g., resource identifier) corresponding to a particular content segment and/or an entire content item. The service device 134 can send an identifier for each of a plurality of content segments of a content item (e.g., for a portion of a content item, such as an advertisement, or for the entire content item) to the manifest device 130. The manifest device 130 can insert the identifier in a subsequent index file. When the redirect device 132 receives a request, the identifier can be determined by decoding the encoding service information in the request. The redirect device 132 can send the identifier, or if the identifier is a URL, send a request/ message to the location indicated by the identifier. The request/message notifies the service device 134 that the content segment has been accessed by a user. Other information can be sent by the redirect device 132 to the service device 134, such as user actions (e.g., play, pause, record), user attentiveness (e.g., passively watching, out of the room), and/or other information relevant to a particular service.

The service device 134 can support (e.g., implement, update) a service based on service events, such as sending the service information, subsequently receiving the service information (e.g., previously sent to the manifest device 130), receiving new service information (e.g., triggered by processing of the original service information), not receiving the service information (e.g., within a time period), and/or the like. The service device 134 can modify the service based on one or more service events. For example, the service device 134 can select content (e.g., a content segment, advertisement content) in response to the service event.

For example, the service information can indicate that the client skipped content (e.g., a content segment, such as an advertisement). The service device 134 can decide to send the same service information (e.g., same content or identifier) to the manifest device 130 when the manifest device 130 later requests the same or a different content item for consumption. As a further explanation, the redirect device 132 can also perform any of the steps described for the service device 208 of FIG. 2 or as described elsewhere herein.

In an example embodiment, the methods and systems disclosed can be located within the manifest device 130 and the redirect device 132, and/or other devices described herein. The manifest device 130 and the redirect device 132 can be configured to assist (e.g., help, aid, trick, enhance, intermediate) a client into sending service information for tracking content consumption or implementing other services as described further herein. As explained in further detail herein, the system 100 can be configured to make a client compatible with a service. When a user requests content, a client can request an index file from the manifest device 130. The manifest device 130 can determine that the client does not support the service. The manifest device 130 can modify the index file typically used for the content by replacing a plurality of uniform resource identifiers (e.g., corresponding to content segments) with modified identifiers that refer to the redirect device. The manifest device 130 can also encode the original uniform resource identifiers and service information, thereby generating encoded information. This encoded information can be inserted as a parameter of corresponding modified identifiers. The modified index file can be transmitted to the client.

The client can request a content segment from the redirect device 132. The redirect device 132 can decode the encoded information and send the original uniform resource locator back to the client. The redirect device 132 can also send the service information to the service device 208 to support the service for the client. This process is described in more detail in the following figures.

Figure 2:
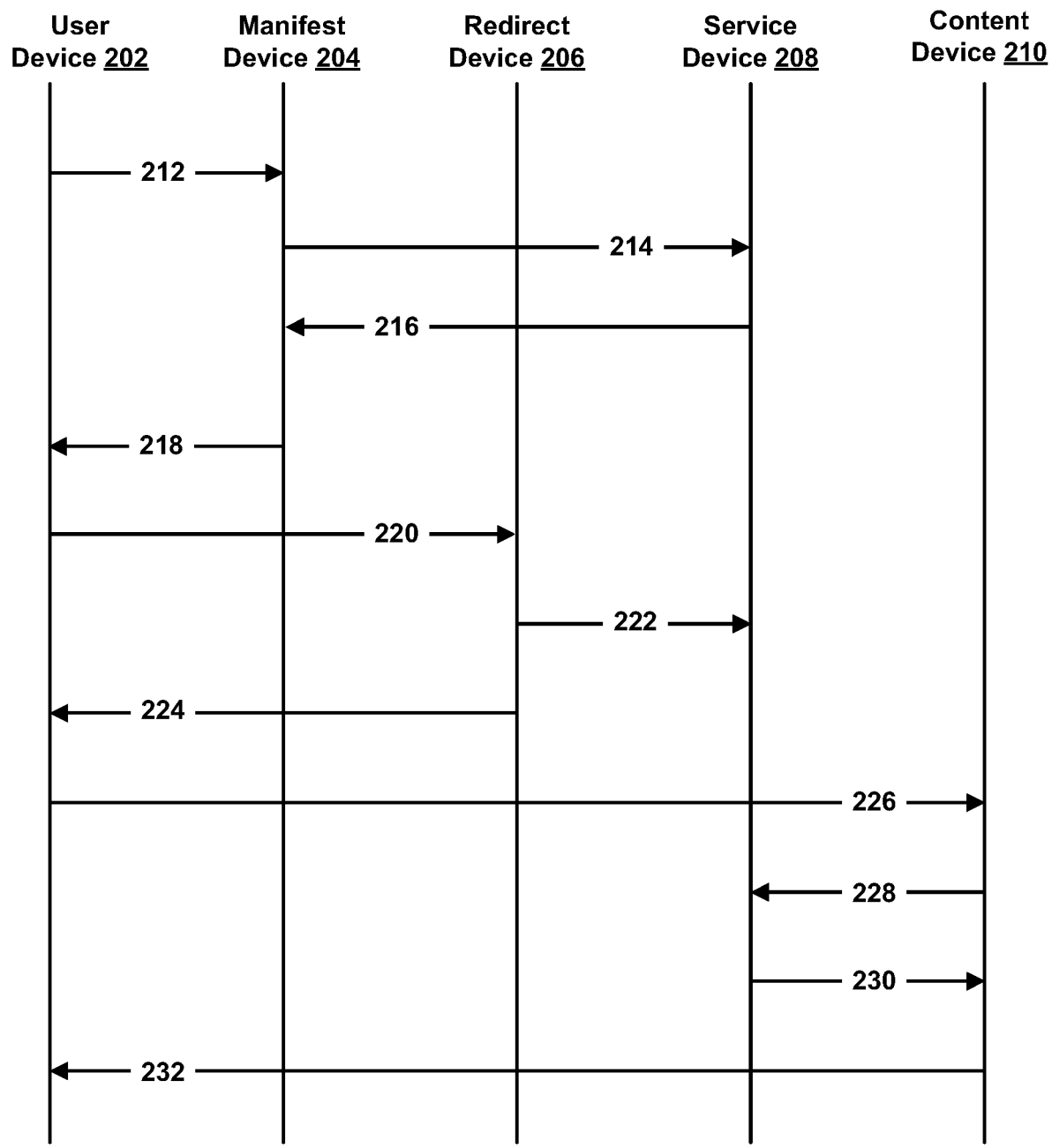
FIG. 2 is a diagram of example process for enhancing service compatibility.
Figure 3A:
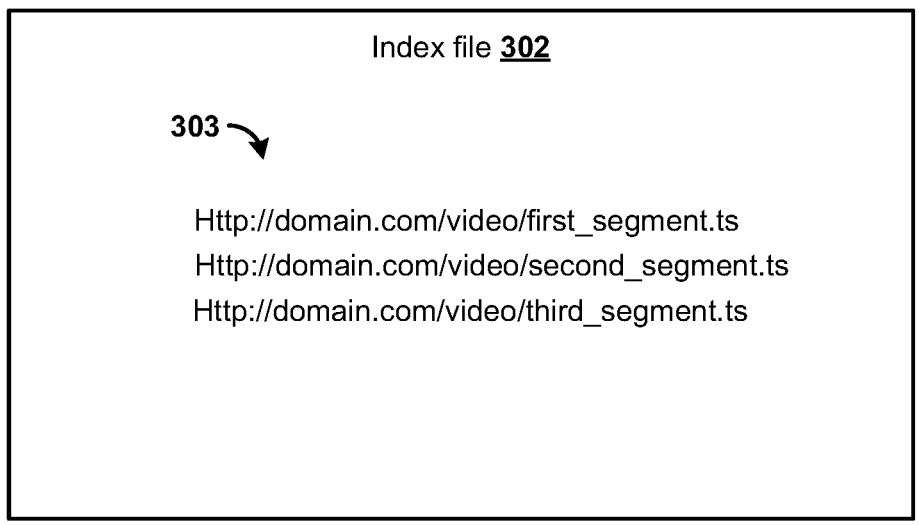
FIG. 3A is a diagram of an example index file for content.
Figure 3B:
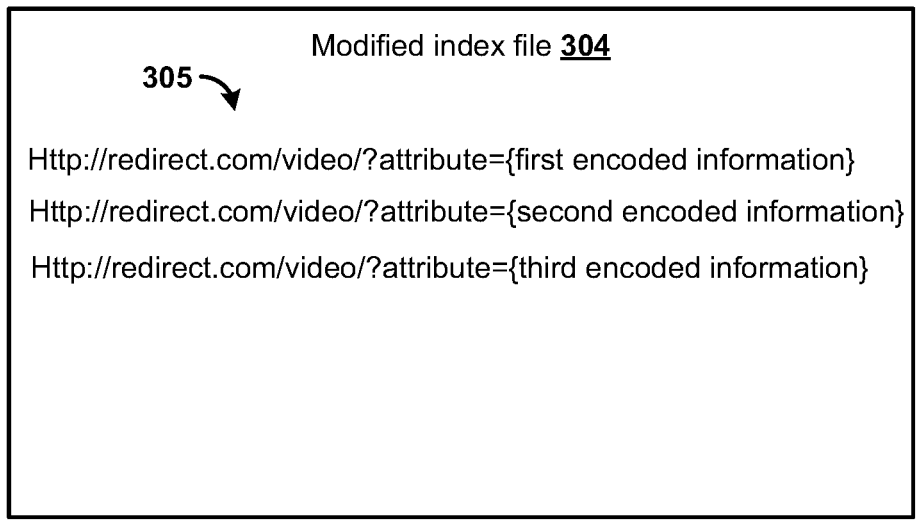
FIG. 3B is a diagram of an example modified index file for the content.

FIG. 2 is a diagram of example process for enhancing service compatibility. The process can comprise communication over a network between a plurality of devices, such as a user device 202, a manifest device 204, a redirect device 206, a service device 208, and/or a content device 210.

At step 212, the user device 202 (e.g., client, limited client, client device, client application, media device 120, mobile device 124, etc.) can send a request for an index file (e.g., manifest) associated with content to the manifest device 204. The index file can be requested in response to a user action requesting content, such as playing a video, clicking a link, and/or the like. The manifest device 204 can retrieve an index file associated with the content. The index file can comprise a plurality of identifiers (e.g., uniform resource identifiers) for retrieving a corresponding plurality of content segments of the content.

At step 214, the manifest device 204 can request service information. The service information can comprise service information specific to a portion of the plurality of identifiers, to each of the plurality of identifiers, to the content (e.g., a content item), to a user, to the user device (e.g., application and/or device, client, media device 120, mobile device 124), to a geographic region, to an account, to a campaign (e.g., advertisement campaign), and/or the like. The service information can comprise information for determining an advertisement, information for tracking consumption of the content, or a combination thereof. The service information can comprise an identifier (e.g., or uniform resource locator for a request) configured to be sent to a service (e.g., service device 208) when a particular portion of content is consumed. The detection of the identifier by any device can be used to trigger an event, such as an event performed by a service (e.g., tracking user consumption, selecting an advertisement, determining a recommendation, automatically recording content, sending an email, updating user information, updating data in a mobile application, searching for related social media, determining an offer for a user, etc.). For example, if the identifier is received for a portion of content, a tracking service can determine that a user has viewed particular content.

The service information can be selected based on user information of a user operating the user device, advertising campaign associated with the content, and/or other information. For example, the service information can be selected based on information stored by a content browser, such as a browser cookie. The information stored by the browser can comprise session information. The service information can be determined based on information about the device, an application on the device (e.g., browser, operating system), user information, and/or the like.

At step 216, the service device 208 can send the service information to the manifest device 204. The manifest device 204 can determine a mode of delivery of the service information. The mode of delivery can comprise a plain delivery mode, an encoded delivery mode, and/or the like. The manifest device 204 can determine the mode of delivery based on user device information (e.g., client information). The user device information can identify or be used to identify software, hardware, version, browser, and/or other features of the user device. The user device information can be used to determine if the user device supports plain delivery mode. In the plain delivery mode, the service information can be inserted directly into fields of index file. The user device supporting plain delivery mode can be configured to recognize and process the service information. If the user device does not support plain delivery mode, then an encoded delivery mode can be selected for the user device 202. The following steps describe the process for using the encoded delivery mode.

The manifest device 204 can generate a modified index file by replacing at least a portion of the plurality of identifiers with a plurality of modified identifiers. The plurality of modified identifiers can be generated by encoding the service information and the plurality of identifiers. For example, a specific identifier of the plurality of identifiers can be encoded with a corresponding portion of the service information. The result of the encoding can be encoded information. The encoded information can be inserted, appended, prepended, paired with, associated with, and/or the like information (e.g., a network address, service port) of the redirect device 206 to form a modified identifier (e.g., uniform resource identifier). The modified identifier can replace a corresponding identifier of the plurality of identifiers in the index file. The modified index file can be completed by generating encoded information for each of the plurality of identifiers and replacing the plurality of identifiers with modified identifiers comprising the information of the redirect device 206 and the corresponding encoded information.

At step 218, the manifest device 204 can send the modified index file (e.g., as shown in FIG. 3B) to the user device 202. The modified index file can be transmitted over a packet switched network, such as an internet protocol network.

At step 220, the user device 202 can access the modified index file and determine a modified identifier for a particular content segment. The user device 202 can use the modified indicator to generate a request for the content segment. The modified identifier of the content segment can indicate that the content is located at the redirect device 206. The user device 202 can transmit a request for the content segment to the redirect device 206. The request can comprise the specific identifier comprising the encoded information. The redirect device 206 can decode the encoded information to determine the identifier of the plurality of identifiers and the corresponding service information (e.g., service information for a specific segment of the content).

At step 220, the redirect device 206 can send the corresponding service information to the service device 208. The service device 208 can use the service information to track the event of a user watching a content segment, such as an advertisement. The service information can be stored in a record (e.g., data structure, database, file, and the like). The record can be used for billing purposes, internal usage reporting, and/or the like. The record can be used to generate reports. For example, usage of a particular service can be tracked and reported. Viewership of content (e.g., advertisement) can be track and reported. The record can be used to adjust advertising pricing. The record can be used to predict and/or suggest types of content to make available and/or recommend for users.

At step 224, the redirect device 206 can send a redirect message comprising the decoded identifier of the plurality of identifiers. The redirect message can direct the user device 202 to retrieve the content segment using the decoded identifier of the plurality of identifiers. At step 226, the user device 202 can request the content segment from the content device 210 using the decoded identifier of the plurality of identifiers. The request can comprise, for example, an HTTP request.

At step 228, the content device 210 can optionally request information and/or content from the service device 208. For example, if the requested content relates to a service, the content device 210 can request the information and/or content from the service device 208. The content can comprise one or more content segments for an advertisement. At step 230, the service device 208 can select and send the information and/or content to the content device 210. For example, the service device 208 can select an advertisement to insert into content. The service device 208 can select the advertisement based on tracked service information (e.g., related to a particular user). For example, if the tracked service information indicates that a user skipped part of an advertisement, the same or a different advertisement can be selected for the user. The type of advertisement can be used to determine a new advertisement of a different type.

At step 232, the content device 210 can send the requested content segment to the user device 202. The user device 202 can play the content segment for user. The content device 210 can find the next content segment (e.g., in time order) in the modified index file. Step 220 through step 232 can be performed for each of the content segments in the modified index file.

FIG. 3A is a diagram of an example index file 302 for content. The index file 302 can be generated by a manifest device 204. The index file 302 can be transmitted to a user device (e.g., client, client application, client device, media device 120, mobile device 124), such as if the user device supports a service, such as a tracking service, for example. The index file 302 can comprise a first plurality of identifiers 303. One or more (or each) of the first plurality of identifiers 303 can comprise a uniform resource locator. One or more (or each) of the first plurality of identifiers 303 can comprise a protocol identifier (e.g., HTTP), a domain (e.g., domain.com), a file structure (e.g., /video/), a file name (e.g., first_segment.ts), and/or other information. FIG. 3B is a diagram of an example modified index file 304 for communicating with the redirect device 206. The modified index file 304 can be generated by the manifest device 204 for a user device (e.g., user device, media device 120, mobile device 124) that does not support a service (e.g., tracking service). The modified index file 304 can comprise a second plurality of identifiers 305. One or more (or each) of the second plurality of identifiers 305 can comprise a protocol identifier (e.g., HTTP), a domain (e.g., redirect.com), a file structure (e.g., /video/), an encoded portion (e.g., {first encoded information}), and/or other information. One or more (or each) of the second plurality of identifiers 305 can be generated by replacing the domain of an identifier of the first plurality of identifiers 303 with a domain for the redirect device 206. One or more (or each) of the second plurality of identifiers 303 can be generated by encoding all or a portion of one of the first plurality of identifiers 303, as described further herein. The encoded portion can then be inserted as an attribute (e.g., or be in any field, directory, or namespace). The encoded portion can comprise an entire identifier or a portion thereof (e.g., the file name, the file name and file directory, the domain and file name and file directory, or any combination of the parts of a uniform resource locator). The portions of the identifier can be encoded together and/or separately. The portions of the identifier can be inserted as one attribute or as multiple attributes.

For example, a first identifier of the first plurality of identifiers 303 can comprise "Http://domain.com/video/first_segment.ts." A corresponding identifier can be generated for the modified index file 304 by encoding the first identifier as "{first encoded information}." Then "domain.com" can be replaced with "redirect.com" (e.g., the domain of the redirect device 206). The result can be "Http://redirect.com/video/?attribute={first encoded information}." The same process can be followed for the remaining identifiers of the first plurality of identifiers 303 to generate the modified index file 304. It should be noted that the names of the portions of the identifiers used are merely generic names meant to represent any file using any naming scheme.

FIG. 4 is a flowchart of an example method for supporting content services. At step 402, a request for content can be received from a user device (e.g., client, client application, client device, media device 120, mobile device 124). The request can be received by a first device, such as content server, manifest device, and/or the like. For example, the user device can comprise and/or be associated with a browser (e.g., a content browser, a web browser), a plugin, a script, a program module (e.g., a program module of a user interface of a streaming device, such as a set top box), a standalone application (e.g., a mobile application, a desktop application, a set top box application), and/or the like. The user device can be configured to display content, such as video, audio, images, and/or text. The user device can be configured to receive a content stream (e.g., adaptive bit rate content stream). For example, the user device can be configured to request the content stream based on an index file (e.g., a manifest file) comprising a list of content segments (e.g., incremental blocks of data). The request can comprise a request for the content stream or a request for the index file. The index file can comprise resource locators (e.g., uniform resource locator) corresponding to a location for each of the content segments. The user device can request the segments (e.g., sequentially) based on a protocol, such as hypertext transfer protocol (HTTP). For example, the request can comprise an HTTP request.

At step 404, identification information for the user device can be determined (by the first device). The identification information can be determined from the request. The request can comprise identification information in a header (e.g., a HTTP header, User-Agent header). For example, the identification information can identify a specific content browser (e.g., a web browser). The identification information can comprise a version number of the user device. In some scenarios, the identification information can be received in a communication separate from the request. The identification information can be requested from the user device before or after receiving the request. The identification information can be determined based on a network address (e.g., internet protocol address, media access control address) from which the request is received. A lookup can be performed to determine if any user device (e.g., client, client application, client device, media device 120, mobile device 124) is associated with the network address.

At step 406, a determination can be made (e.g., by the first device) to use a redirect device for (e.g., for serving content to) the user device based on the identification information. The identification information can be used to determine a characteristic of the user device, such as a type, version, operating mode (e.g., power saving, limited processing), and/or the like of the user device. The identification information and/or the characteristic can be used to determine whether the user device supports a service, such as a tracking service (e.g., advertisement impression service, consumption tracking service, content recommendation service, and/or content customization service). If the user device does not support the service, then it can be determined to use the redirect device for the user device. The redirect device can be used to assist (e.g., help, aid, trick, enhance) the user device to support the service (e.g., while consuming content).

At step 408, a first resource locator indicating a location for accessing at least a portion of the content can be determined (e.g., by the first device). The first resource locator can indicate a location of a segment of the content. The first resource locator can comprise a uniform resource identifier, such as a uniform resource locator (URL). The first resource locator can comprise a combination of one or more characters, such as numbers, letters, punctuation marks, symbols (e.g., forward slash '/', backward slash '\', hashtag '#', at symbol '@', or other useful symbol). The first resource locator can indicate a directory structure. The first resource locator can comprise a domain name, a network address (e.g., internet protocol address), a port number (e.g., number for listening for content requests), and/or the like. For example, the first resource locator can comprise a host portion comprising the domain name, the network address, the port number, and/or the like.

The first resource locator can comprise a file system portion. For example, the file system portion can comprise a file name (e.g., "segment.ts"). The file system portion can comprise a directory structure (e.g., "/folder/video/").

The first resource locator can comprise a query portion comprising one more query parameters (e.g., in the form "parameter=parameterValue" or other similar form). The first resource locator (e.g., query portion) can comprise a parameter identifier and a corresponding parameter value. For example, the first resource locator can be formatted for an HTTP GET request. For example, the first resource locator can be as follows: "domain.com/?attribute=attributeValue" where domain.com is an address, "attribute" is an attribute identifier, "attributeValue" is the value of the attribute, and "?" indicates the presence of parameter.

The method can comprise generating encoded information. The encoded information can comprise the first resource locator. The encoded information can comprise service information for a service associated with the content. The first resource locator can be combined (e.g., append, prepend) with the service information. The encoded information can be generated by encoding the first resource locator and the service information (e.g., together, separately). The first resource locator and the service information can be encoded from a first character set to a second character set. The encoded information can be encoded using base encoding. The first character set can comprise a different number of characters than the second character set. The second character set can be a subset of the first character set. The second character set can have a predefined number of characters. For example, the encoded information can be encoded using base 16, base 32, base 64, base 128, and/or the like encoding scheme.

The service information can comprise information for determining an advertisement, information for tracking consumption of the content, or a combination thereof. The service information can be selected based on user information of a user operating the client, advertising campaign associated with the content, and/or other information. For example, the service information can be selected based on information stored by a content browser, such as a browser cookie. The information stored by the browser can comprise session information. The service information can be determined based on information about the device, an application on the device (e.g., browser, operating system), user information, and/or the like.

The user device may not be configured to process the service information. For example, the user device may not be configured with a current version of software or may be utilizing a protocol older than the latest version of the software or the protocol. The user device may not be configured to process tracking instructions. For example, the user device may not be configured to request, call, message, and/or otherwise transmit information indicating tracking data. Tracking data can comprise data indicating that a user has requested, played, viewed, and/or otherwise consumed the content. The tracking data can indicate that a user actively or passively consumed the data. The tracking data can indicate that the user interacted with the content (e.g., clicked on an advertisement, bought a product advertised).

At step 410, a second resource locator can be generated (e.g., by the first device). The second resource locator can comprise a reference (e.g., indicating, pointing) to the redirect device. The second resource locator can comprise a uniform resource identifier, such as a uniform resource locator (URL). The second resource locator can comprise a combination of one or more characters, such as numbers, letters, punctuation marks, symbols (e.g., forward slash '/', backward slash '\', hashtag '#', at symbol '@', or other useful symbol). The second resource locator can indicate a directory structure. The second resource locator can comprise a domain name, a network address (e.g., internet protocol address), a port number (e.g., number for listening for content requests), and/or the like. For example, the second resource locator can comprise a host portion comprising the domain name, the network address, the port number, and/or the like. The first resource locator can comprise a file system portion. For example, the file system portion can comprise a file name (e.g., "segment.ts"). The file system portion can comprise a directory structure (e.g., "/folder/video/"). The second resource locator can comprise a query portion comprising one more query parameters (e.g., in the form "parameter=parameterValue" or other similar form). The second resource locator (e.g., the query portion) can comprise a parameter identifier and a corresponding parameter value. For example, the second resource locator can be formatted for an HTTP GET request. For example, the second resource locator can be as follows: "domain.com/?attribute=attributeValue" where domain.com is an address, "attribute" is an attribute identifier, "attributeValue" is the value of the attribute, and "?" indicates the presence of parameter.

The second resource locator can comprise the encoded information. For example, a network address (e.g., the domain name, the internet protocol address) of the redirect device can be determined (e.g., by the first device). The network address can be stored or received via a query for a current address and/or location of the redirect device. The second resource locator can be generated by adding one or more characters to (e.g., to the end of) a network address. The one or more characters can comprise the encoded information. For example, the encoded information can be added as characters of a directory structure (e.g., characters separated by forward slashes or back slashes). The encoded information can be added to the address as a parameter value associated with a parameter (e.g., as the attribute value of the attribute).

Generating the second resource locator can comprise generating an index file (e.g., a manifest) comprising a plurality of resource locators for corresponding segments of the content. Each of the plurality of resource locators can refer to (e.g., indicate, point to, identify) the redirect device. The plurality of resource locators can comprise the second resource locator. The second resource locator can comprise service information (e.g., identifiers for tracking viewership). The service information can be specific to each segment of content and/or be the same for a many or all of the segments of content. For example, an advertisement can comprise a plurality of segments of content. The service information can be the same for a portion (e.g., first half, second half, or same for all) of the plurality of segments. For example, the content can be subdivided into halves, thirds, quarters, and/or any other appropriate subdivision. In some cases, the second resource locator for a content segment may not include service information. For example, the service information can be included only at the end of content, such as at the end of an advertisement.

At step 412, the second resource locator can be transmitted (e.g., by the first device) in response to the request for content. The second resource locator can be transmitted to the user device. The second resource locator can be transmitted via a network. The user device can send another request for at least a portion of the content (e.g., a content segment) to the redirect device based on the second resource locator. The redirect device can be configured to determine the first resource locator and the service information based on the second resource locator. The redirect device can transmit a redirect message comprising the first resource locator to the user device. The redirect device can communicate with the service based on the service information.

The redirect device can be configured to decode the encoded information into the second resource locator and service information. The encoded information can be decoded based on a decoding algorithm configured to convert characters from the second character set back to the first character set. For example, the decoding algorithm can convert base 16, base 32, base 64, base 128, and/or the like encoded characters back to an original character set (e.g., Unicode, ASCII).

The redirect device can be configured to communicate with a service using the service information. The service information can comprise information for determining an advertisement, information for tracking consumption of the content, or a combination thereof. The user device may not be configured to process the service information. The redirect device can process the service information instead of (e.g., on behalf of) the user device. The redirect device can be configured to request, call, message, and/or otherwise transmit information indicating tracking data.

FIG. 5 is a flowchart of another example method for supporting content services. At step 502, a first request for content can be transmitted to a content device. The first request can be transmitted by a user device (e.g., client application, client device, client, media device 120, mobile device 124). For example, the user device can comprise a browser (e.g., a content browser, a web browser), a plugin, a script, a program module (e.g., a program module of a user interface of a streaming device, such as a set top box), a standalone application (e.g., a mobile application, a desktop application, a set top box application), and/or the like. The user device can be configured to display content, such as video, audio, images, and/or text. The user device can be configured to receive a content stream. For example, the user device can be configured to request the content stream based on an index file (e.g., a manifest file) comprising a list of content segments (e.g., incremental blocks of data). The request can comprise a request for the content stream or a request for the index file. The index file can comprise resource locators (e.g., uniform resource locator) corresponding to a location for each of the content segments. The user device can request the segments (e.g., sequentially) based on a protocol, such as hypertext transfer protocol (HTTP). For example, the request can comprise an HTTP request.

At step 504, a first resource locator generated by the content device can be received (e.g., by the user device) in response to transmitting the request. The first resource locator can be received by the user device. Receiving the first resource locator can comprise receiving an index file (e.g., a manifest) comprising a plurality of resource locators. One or more (or each) of the plurality of resource locators can refer to (e.g., indicate, point to, identify) the redirect device.

The first resource locator can comprise a uniform resource identifier, such as a uniform resource locator (URL). The first resource locator can comprise a combination of one or more characters, such as numbers, letters, punctuation marks, symbols (e.g., forward slash '/', backward slash '\', hashtag '#', at symbol '@', or other useful symbol). The first resource locator can indicate a directory structure. The first resource locator can comprise a domain name, a network address (e.g., internet protocol address), a port number (e.g., number for listening for content requests), and/or the like. For example, the first resource locator can comprise a host portion comprising the domain name, the network address, the port number, and/or the like. The first resource locator can comprise a query portion comprising one more query parameters (e.g., in the form "parameter=parameterValue" or other similar form). The first resource locator (e.g., query portion) can comprise a parameter identifier and a corresponding parameter value. For example, the first resource locator can be formatted for an HTTP GET request. For example, the first resource locator can be as follows: "domain.com/?attribute=attributeValue" where domain.com is an address, "attribute" is an attribute identifier, "attributeValue" is the value of the attribute, and "?" indicates the presence of parameter.

The first resource locator can comprise encoded information. The encoded information can be stored as a parameter value (e.g., as the attribute value of the attribute). The encoded information can be encoded by a content device. The content device can determine that the user device is not able to support and/or otherwise communicate with a service. The content device can be configured to determine a second resource locator and service information. The content device can determine a second resource locator based on the request for content. The second resource locator can indicate a location of a segment of the content. The content device can determine service information. The service information can be selected based on user information of a user operating the user device, advertising campaign associated with content, and/or other information.

The content device can determine the address (e.g., the domain name, the internet protocol address) of a redirect device. For example, the address can be stored or received via a query for a current address and/or location of the redirect device. The content device can generate the first resource locator by adding one or more characters to (e.g., to the end of) the address. For example, the encoded information can be added as characters of a directory structure (e.g., characters separated by forward slashes or back slashes). The encoded information can be added to the address as a parameter value associated with a parameter. The content device can combine (e.g., append) service information to the first resource locator. The content device can generate the encoded information by encoding the first resource locator and the service information (e.g., together, separately).

The encoded information can be encoded using base encoding. The content device can be configured to encode the second resource locator and the service information as the encoded information by converting from a first character set to a second character set. The first character set can comprise a different number of characters than the second character set. The second character set can be a subset of the first character set. The second character set can have a predefined number of characters. For example, the encoded information can be encoded using base 16, base 32, base 64, base 128, and/or the like encoding scheme.

The encoded information can be encrypted. An encryption key and/or decryption key can be shared between devices, such as the content device, the redirect device, and/or any of the devices shown in FIG. 1 and FIG. 2

At step 506, a second request for at least a portion of the content using the first resource locator can be transmitted (e.g., by the user device). The second request can be transmitted to a redirect device. The redirect device can be configured to decode the encoded information into the second resource locator and service information. The encoded information can be decoded based on a decoding algorithm configured to convert characters from the second character set back to the first character set. For example, the decoding algorithm can convert base 16, base 32, base 64, base 128, and/or the like encoded characters back to an original character set (e.g., Unicode, ASCII).

The redirect device can be configured to communicate with a service using the service information. The service information can comprise information for determining an advertisement, information for tracking consumption of the content, or a combination thereof. The user device may not be configured to process the service information. For example, the user device may not be configured with a current version of software or may be utilizing a protocol older than the latest version of the software or the protocol. The user device may not be configured to process tracking instructions. For example, the user device may not be configured to request, call, message, and/or otherwise transmit information indicating tracking data. Tracking data can comprise data indicating that a user has requested, played, viewed, and/or otherwise consumed at least a portion of the content. The tracking data can indicate that a user actively or passively consumed the data. The tracking data can indicate that the user interacted with the content (e.g., clicked on an advertisement, bought a product advertised). The redirect device can process the service information instead of (e.g., on behalf of) the user device. The redirect device can be configured to request, call, message, and/or otherwise transmit information indicating tracking data.

At step 508, a redirect message comprising the second resource locator can be received (e.g., by the user device) in response to requesting the content using the first resource locator. The redirect message can be received from the redirect device. The redirect message can comprise an instruction (e.g., or code associated with the instruction) indicating that the content is located at (e.g., retrievable at) the second resource locator. The redirect message can comprise an HTTP redirect message. For example, the redirect message can comprise an HTTP response status code 302. The second resource locator can be stored in a location header field of the HTTP redirect message.

At step 510, a third request for at least a portion of the content can be transmitted (e.g., by the user device) based on the second resource locator. The third request can comprise an HTTP request (e.g., HTTP GET request) for a segment of the content associated with the second resource locator. The third request can be generated by determining a host portion of the second resource locator. The host portion can be inserted into a host field of the request. A query portion of the second resource locator can also be determined and inserted into a header or body of the third request.

The method 500 can further comprise receiving the content customized to a user of the user device (e.g., client application) based on the service information. For example, a service device can receive the service information from the redirect device. The service device can be configured to track content consumption (e.g., advertisement impressions). The service device can determine future content (e.g., advertisement, recommendations) to serve to the user device based on the service information. For example, the service device can determine trends in the service information. The service device can include the user device in a particular advertising campaign based the service information (e.g., or the trends).

Figure 6:
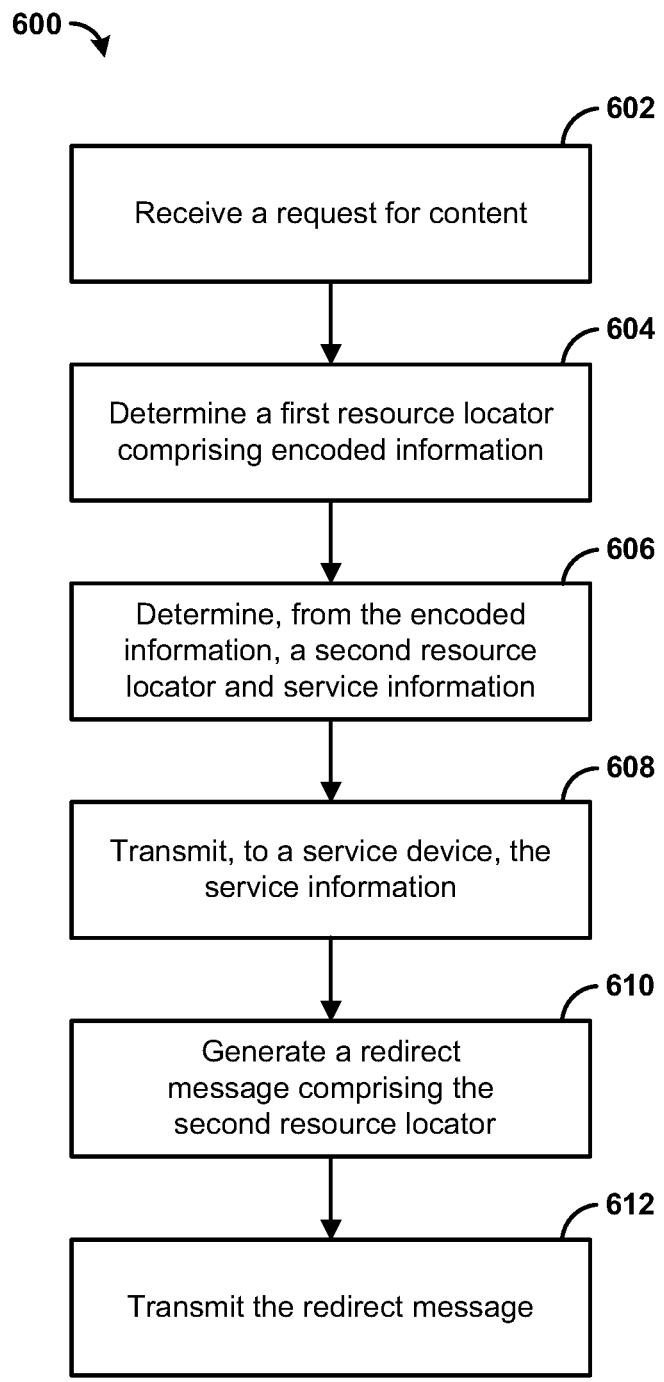
FIG. 6 is a flowchart of another example method for supporting content services.

FIG. 6 is a flowchart of another example method 600 for supporting content services. At step 602, a request for content can be received. The request can be received by a first device, such as a redirect device. The request can be received from a user device (e.g., a client, a client application, a client device, media device 120, mobile device 124). For example, the user device can comprise a browser (e.g., a content browser, a web browser), a plugin, a script, a program module (e.g., a program module of a user interface of a streaming device, such as a set top box), a standalone application (e.g., a mobile application, a desktop application, a set top box application), and/or the like. The user device can be configured to display content, such as video, audio, images, and/or text. The user device can be configured to stream the content. For example, the user device can be configured to request a content stream based on an index file (e.g., a manifest file) comprising a list of content segment (e.g., incremental blocks of data). The request can comprise a request for the content stream or a request for the index file. The index file can comprise resource locators (e.g., uniform resource locator) corresponding to a location for each of the content segment. The user device can request the segments (e.g., sequentially) based on a protocol, such as hypertext transfer protocol (HTTP). For example, the request can comprise an HTTP request.

The user device may not be configured to process the service information. For example, the user device may not be configured with a current version of software or may be utilizing a protocol older than the latest version of the software or protocol. The user device may not be configured to process tracking instructions. For example, the user device may not be configured to request, call, message, and/or otherwise transmit information indicating tracking data. Tracking data can comprise data indicating that a user has requested, played, viewed, and/or otherwise consumed the content. The tracking data can indicate that a user actively or passively consumed the data. The tracking data can indicate that the user interacted with the content (e.g., clicked on an advertisement, bought a product advertised).

At step 604, a first resource locator comprising encoded information within the request can be determined (e.g., by the first device). The first resource locator can comprise a uniform resource identifier, such as a uniform resource locator (URL). The first resource locator can comprise a combination of one or more characters, such as numbers, letters, punctuation marks, symbols (e.g., forward slash '/', backward slash '\', hashtag '#', at symbol '@', or other useful symbol). The first resource locator can indicate a directory structure. The first resource locator can comprise a domain name, a network address (e.g., internet protocol address), a port number (e.g., number for listening for content requests), and/or the like. For example, the first resource locator can comprise a host portion comprising the domain name, the network address, the port number, and/or the like. The first resource locator can comprise a query portion comprising one more query parameters (e.g., in the form "parameter=parameterValue" or other similar form). The first resource locator (e.g., query portion) can comprise a parameter identifier and a corresponding parameter value. The parameter value can comprise the encoded information. For example, the first resource locator can be formatted for an HTTP GET request. For example, the first resource locator can be as follows: "domain.com/?attribute=attributeValue" where domain.com is an address, "attribute" is an attribute identifier, "attributeValue" is the value of the attribute, and "?" indicates the presence of parameter.

The encoded information can be encoded by a content device. The content device can determine that the user device is not able to support and/or otherwise communicate with a service. The content device can determine a second resource locator based on the request for content. The second resource locator can indicate a location of a segment of the content. The content device can determine service information. The service information can be selected based on user information of a user operating the user device, advertising campaign associated with content, and/or other information.

The content device can determine the address (e.g., the domain name, the internet protocol address) of a redirect device. For example, the address can be stored or received via a query for a current address and/or location of the redirect device. The content device can generate the first resource locator by adding one or more characters to (e.g., to the end of) the address. For example, the encoded information can be added as characters of a directory structure (e.g., characters separated by forward slashes or back slashes). The encoded information can be added to the address as a parameter value associated with a parameter. The content device can combine (e.g., append) service information to the first resource locator. The content device can generate the encoded information by encoding the first resource locator and the service information (e.g., together, separately).

The encoded information can be encoded using base encoding. The encoded information can be encoded from a first character set to a second character set. The first character set can comprise a different number of characters than the second character set. The second character set can be a subset of the first character set. The second character set can have a predefined number of characters. For example, the encoded information can be encoded using base 16, base 32, base 64, base 128, and/or the like encoding scheme.

The encoded information can be encrypted. An encryption key and/or decryption key can be shared between devices, such as the content device, the redirect device, and/or any of the devices shown in FIG. 1 and FIG. 2

At step 606, the second resource locator and service information can be determined (e.g., by the first device) by decoding the encoded information. Determining the second resource locator and the service information by decoding the encoded information can comprise converting from the first character set to the second character set. The encoded information can be decoded based on a decoding algorithm configured to convert characters from the second character set back to the first character set. For example, the decoding algorithm can convert base 16, base 32, base 64, base 128, and/or the like encoded characters back to an original character set (e.g., Unicode, ASCII).

At step 608, the service information can be transmitted (e.g., by the first device) to a service device. The service device can be configured to manage (e.g., support, implement) a service. The service device can be configured to process the service information. The service information can be generated by and/or generated for the service. The service information can comprise information for determining an advertisement, information for tracking consumption of the content, or a combination thereof. The service device can comprise an advertisement impression server configured to count a number of times an advertisement in the content is viewed.

At step 610, a redirect message comprising the second resource locator can be generated (e.g., by the first device). The redirect message can comprise an instruction (e.g., or code associated with the instruction) indicating that the content is located at (e.g., retrievable at) the second resource locator. The redirect message can comprise an HTTP redirect message. For example, the redirect message can comprise an HTTP response status code 302. The second resource locator can be stored in a location header field of the HTTP redirect message.

At step 612, the redirect message can be transmitted (e.g., by the first device) in response to the request for content. The redirect message can be transmitted to the user device (e.g., client application). The redirect message can be transmitted via a network.

Figure 7:
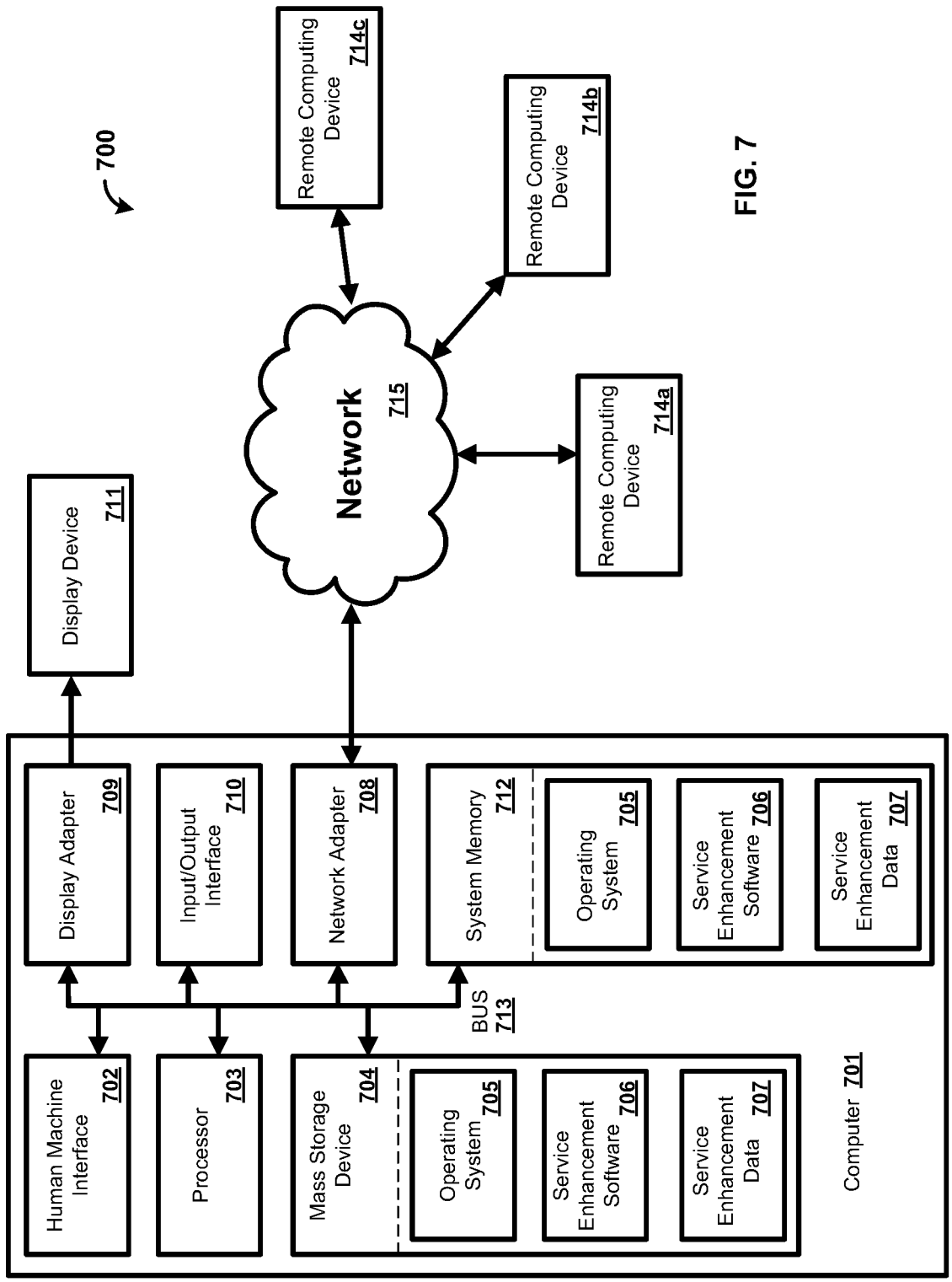
FIG. 7 is a block diagram of an example computing device in which the present methods and systems operate.

The methods and systems can be implemented on a computer 701 as shown in FIG. 7 and described below. By way of example, manifest device 130, redirect device 132, the service device 134 of FIG. 1 can be computers as example in FIG. 7. As a further example, any of the devices of FIG. 1 and FIG. 2 can be computers as shown in FIG. 7. Similarly, the methods and systems disclosed can utilize one or more computers to perform one or more functions in one or more locations. FIG. 7 is a block diagram of an operating environment for performing the disclosed methods. This operating environment is only an example of an operating environment and is not intended to suggest any limitation as to the scope of use or functionality of operating environment architecture. Neither should the operating environment be interpreted as having any dependency or requirement relating to any one or combination of components in the example operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors 703, a system memory 712, and a system bus 713 that couples various system components including the one or more processors 703 to the system memory 712. The system can utilize parallel computing.

The system bus 713 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the one or more processors 703, a mass storage device 704, an operating system 705, service enhancement software 706, service enhancement data 707, a network adapter 708, the system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computer 701 typically comprises a variety of computer readable media. Example readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as the service enhancement data 707 and/or program modules such as the operating system 705 and the service enhancement software 706 that are immediately accessible to and/or are presently operated on by the one or more processors 703.

The computer 701 can also comprise other removable/non-removable, volatile/non-volatile computer storage media. By way of example, FIG. 7 comprises the mass storage device 704 which can provide non-volatile storage of computer code, computer readable instructions, data structures, program modules, and other data for the computer 701. For example and not meant to be limiting, the mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, the operating system 705 and the service enhancement software 706. Each of the operating system 705 and the service enhancement software 706 (or some combination thereof) can comprise elements of the programming and the service enhancement software 706. The service enhancement data 707 can also be stored on the mass storage device 704. The service enhancement data 707 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems.

The user can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 703 via the human machine interface 702 that is coupled to the system bus 713, but can be connected by other interface and bus structures, such as a parallel port, game port, an IEEE 1394 Port (also known as a Firewire port), a serial port, or a universal serial bus (USB).

The display device 711 can also be connected to the system bus 713 via an interface, such as the display adapter 709. It is contemplated that the computer 701 can have more than one display adapter 709 and the computer 701 can have more than one display device 711. For example, the display device 711 can be a monitor, an LCD (Liquid Crystal Display), or a projector. In addition to the display device 711, other output peripheral devices can comprise components such as speakers (not shown) and a printer (not shown) which can be connected to the computer 701 via the Input/Output Interface 710. Any step and/or result of the methods can be output in any form to an output device. Such output can be any form of visual representation, including, but not limited to, textual, graphical, animation, audio, tactile, and the like. The display device 711 and computer 701 can be part of one device, or separate devices.

The computer 701 can operate in a networked environment using logical connections to one or more remote computing devices 714a,b,c. By way of example, a remote computing device can be a personal computer, portable computer, smartphone, a server, a router, a network computer, a peer device or other common network node, and so on. Logical connections between the computer 701 and a remote computing device 714a,b,c can be made via a network 715, such as a local area network (LAN) and/or a general wide area network (WAN). Such network connections can be through the network adapter 708. The network adapter 708 can be implemented in both wired and wireless environments. Such networking environments are conventional and commonplace in dwellings, offices, enterprise-wide computer networks, intranets, and the Internet.

For purposes of example, application programs and other executable program components such as the operating system 705 are shown herein as discrete blocks, although it is recognized that such programs and components reside at various times in different storage components of the computer 701, and are executed by the one or more processors 703 of the computer. An implementation of the service enhancement software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be example rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as example only, with a true scope and spirit being indicated by the following claims.

The invention claimed is:

1. A method comprising:
   receiving, from a user device, a request for content;
   determining a first resource locator for at least a portion of the content;
   determining, based on the first resource locator and based on the user device being unable to support a service associated with the content, a manifest comprising a second resource locator; and
   sending, to the user device, the manifest.

2. The method of claim 1, wherein the second resource locator is associated with a redirect device.

3. The method of claim 1, further comprising:
   determining, based on the request for the content, an identifier of the user device; and
   determining, based on the identifier of the user device, that the user device is unable to support the service.

4. The method of claim 1, wherein the second resource locator comprises encoded information and wherein the encoded information comprises the first resource locator.

5. The method of claim 4, wherein the encoded information is generated by encoding the first resource locator from a first encoding character set to a second encoding character set.

6. The method of claim 1, wherein the service comprises at least one of an advertisement service or a tracking service.

7. The method of claim 1, wherein the manifest comprises a plurality of resource locators, wherein at least one resource locator of the plurality of resource locators is associated with a segment of a plurality of segments of the content, and wherein the at least one resource locator of the plurality of resource locators refers to a redirect device.

8. A method comprising:
   sending, by a user device to a content device, a first request for content;
   receiving, from the content device and based on the first request for the content, a first resource locator;
   sending, to a first computing device and based on the first resource locator, a second request for at least a portion of the content;
   receiving, from the first computing device and based on the second request, a second resource locator; and
   sending, to the content device and based on the second resource locator, a third request for the at least the portion of the content.

9. The method of claim 8, wherein receiving the second resource locator comprises receiving a redirect message, wherein the redirect message comprises the second resource locator.

10. The method of claim 8, wherein the first resource locator comprises encoded information associated with a service associated with the content.

11. The method of claim 8, wherein the first resource locator comprises encoded information associated with the second resource locator.

12. The method of claim 11, wherein the content device is configured to determine the second resource locator and encode the second resource locator as the encoded information.

13. The method of claim 8, further comprising receiving, based on the third request, the at least the portion of the content.

14. The method of claim 8, wherein receiving the first resource locator comprises receiving a manifest comprising a plurality of resource locators, wherein at least one resource locator of the plurality of resource locators refers to the first computing device.

15. A method comprising:
   receiving, by a first computing device associated with a first resource locator, from a user device, and based on a determination that the user device is unable to support a service associated with content, a request for the content;
   determining, based on the request for the content, a second resource locator and service information;
   sending, to a second computing device and based on the service information, service data;
   determining, based on the second resource locator, a redirect message; and
   sending, to the user device, the redirect message comprising the second resource locator.

16. The method of claim 15, wherein the request for the content comprises encoded information comprising at least one of the second resource locator or the service information.

17. The method of claim 15, wherein determining the second resource locator and the service information comprises decoding at least a portion of the request for the content.

18. The method of claim 15, wherein the user device is configured to receive the content via the second resource locator.

19. The method of claim 15, wherein the user device is configured to determine the first resource locator from a manifest received from a content device.

20. The method of claim 15, wherein the service associated with the content comprises at least one of an advertisement service or a tracking service, and the service information comprises at least one of information for determining an advertisement or information for tracking consumption of the content.

* * * * *